United States Patent
Li et al.

(10) Patent No.: US 9,743,490 B1
(45) Date of Patent: Aug. 22, 2017

(54) LIGHTING DEVICE AND DETECTION METHOD THEREOF

(71) Applicant: VIVOTEK INC., New Taipei (TW)

(72) Inventors: Wen-Yuan Li, New Taipei (TW); Chih-Hung Chang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/432,543

(22) Filed: Feb. 14, 2017

(30) Foreign Application Priority Data

Feb. 18, 2016 (TW) .............................. 105104829 A

(51) Int. Cl.
*H05B 37/02* (2006.01)

(52) U.S. Cl.
CPC ................................ *H05B 37/0218* (2013.01)

(58) Field of Classification Search
CPC   H05B 37/02; H05B 37/0218; H05B 37/0227; H05B 37/0272; H05B 33/08; H05B 33/0854
USPC ........ 315/158, 160, 291, 307, 308, 312, 360
See application file for complete search history.

(56) References Cited

U.S. PATENT DOCUMENTS

2014/0139138 A1* 5/2014 Liu .................... H05B 33/0872
315/297

* cited by examiner

*Primary Examiner* — Jimmy Vu
(74) *Attorney, Agent, or Firm* — Andrew M. Calderon; Roberts Mlotkowski Safran Cole & Calderon, P.C.

(57) ABSTRACT

A lighting device includes a light source, a driving module, a sensing module, and a control module. The driving module is configured to drive the light source. The sensing module is configured to obtain a brightness value corresponding to the environmental scene. The control module is configured to control the driving module to use a first current to drive the light source, control the sensing module to obtain a first brightness value, control, when the first brightness value is less than a reference brightness value, the driving module to use a second current to drive the light source, control the sensing module to obtain a second brightness value, the second current being greater than the first current by a predetermined amplitude value, compare the second brightness value with the first brightness value, determine that the light source is in a thermal attenuation state or an optical attenuation state.

11 Claims, 9 Drawing Sheets

LIGHTING DEVICE AND DETECTION METHOD THEREOF

CROSS-REFERENCE TO RELATED APPLICATION

This non-provisional application claims priority under 35 U.S.C. §119(a) to Patent Application No. 105104829 filed in Taiwan, R.O.C. on Feb. 18, 2016, the entire contents of which are hereby incorporated by reference.

BACKGROUND

Technical Field

The present invention relates to a lighting device, and in particular, to a lighting device with a detection function and a detection method thereof.

Related Art

Common light fixtures (for example, LED lamps or incandescent lamps) encounter the problem of brightness attenuation when being used. Currently, factors affecting the brightness of a light fixture may be mainly divided into two types, one of which is brightness attenuation caused by an excessively high temperature of the light fixture, hereinafter referred to as thermal attenuation, and the other is brightness attenuation caused by a decrease in service life after the light fixture is used for a long time, or caused by a substance (for example, dust) affecting a lighting effect on a surface of the light fixture, hereinafter referred to as optical attenuation.

For the foregoing problem of brightness attenuation, in most lighting devices on the market, an additional temperature sensor is used to sense a temperature of a light fixture, so as to analyze whether the temperature of the light fixture is excessively high, and further determine whether a thermal attenuation phenomenon occur, and determine, if the temperature is within an allowed range, that an optical attenuation phenomenon occurs in the light fixture. However, this manner involves relatively high costs due to the usage of the additional temperature sensor.

SUMMARY

In view of the foregoing problem, in an embodiment, a lighting device includes a light source, a driving module, a sensing module, and a control module. The light source is configured to emit light to illuminate an environmental scene. The driving module is coupled to the light source, and is configured to drive the light source. The sensing module is configured to obtain a brightness value corresponding to the environmental scene. The control module is coupled to the driving module and the sensing module, and is configured to control the driving module to use a first current to drive the light source, control the sensing module to obtain a first brightness value, control, when the first brightness value is less than a reference brightness value, the driving module to use a second current to drive the light source, the second current being greater than the first current by a predetermined amplitude value, control the sensing module to obtain a second brightness value, compare the second brightness value with the first brightness value, determine that the light source is in a thermal attenuation state when the second brightness value is less than or equal to the first brightness value, and determine that the light source is in an optical attenuation state when the second brightness value is greater than the first brightness value.

In an embodiment, a detection method of a lighting device includes: using a first current to drive a light source to emit light to illuminate an environmental scene; obtaining a first brightness value corresponding to the environmental scene; comparing the first brightness value with a reference brightness value; using, when the first brightness value is less than the reference brightness value, a second current to drive the light source to emit light to illuminate the environmental scene, where the second current is greater than the first current by a predetermined amplitude value; obtaining a second brightness value corresponding to the environmental scene; comparing the second brightness value with the first brightness value; and determining that the light source is in a thermal attenuation state when the second brightness value is less than or equal to the first brightness value, and determining that the light source is in an optical attenuation state when the second brightness value is greater than the first brightness value.

To sum up, in the embodiments of the present invention, when the brightness of an environmental scene illuminated by a light source is attenuated, an increased current is applied to the light source for detection, and whether the light source is in a thermal attenuation state or an optical attenuation state is determined by comparing a brightness value of the environmental scene before the current is increased and a brightness value of the environmental scene after the current is increased, thereby accurately determining a reason for the brightness attenuation of the light source and avoiding a misjudgment.

DETAILED DESCRIPTION

Figure 1:
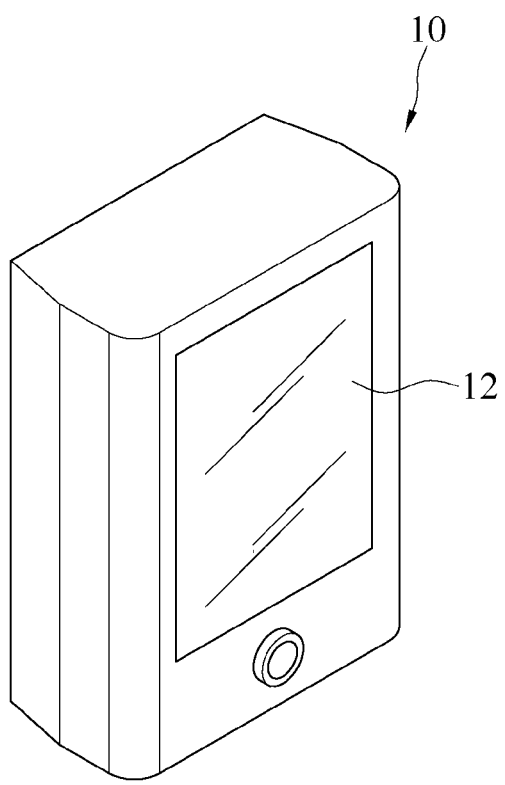
FIG. 1 is a three-dimensional diagram of an embodiment of a lighting device according to the present invention.
Figure 2:
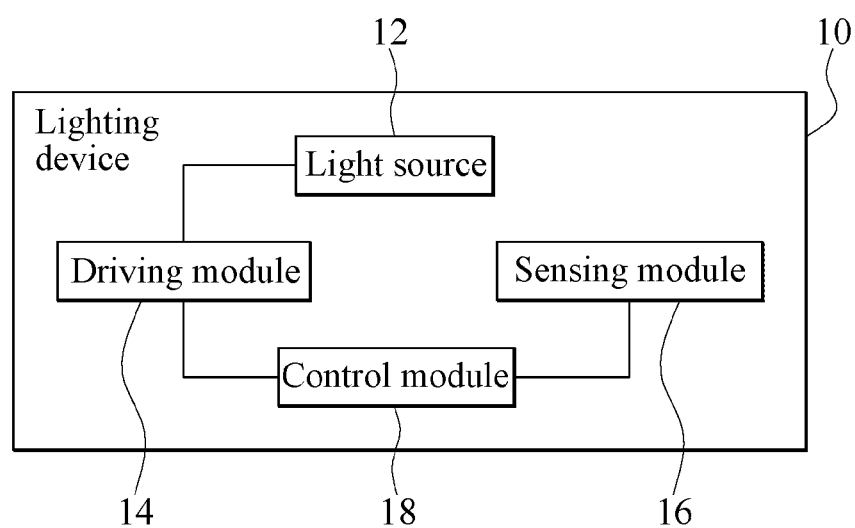
FIG. 2 is a block diagram of the embodiment of the lighting device according to the present invention.

Referring to FIG. 1 and FIG. 2, FIG. 1 is a three-dimensional diagram of an embodiment of a lighting device according to the present invention, and FIG. 2 is a block diagram of the embodiment of the lighting device according to the present invention. In an embodiment, a lighting device 10 includes a light source 12, a driving module 14, a sensing module 16, and a control module 18, where the lighting device 10 may be specifically a lamp, such as a desk lamp, street lamp, or a wall lamp.

Figure 3:
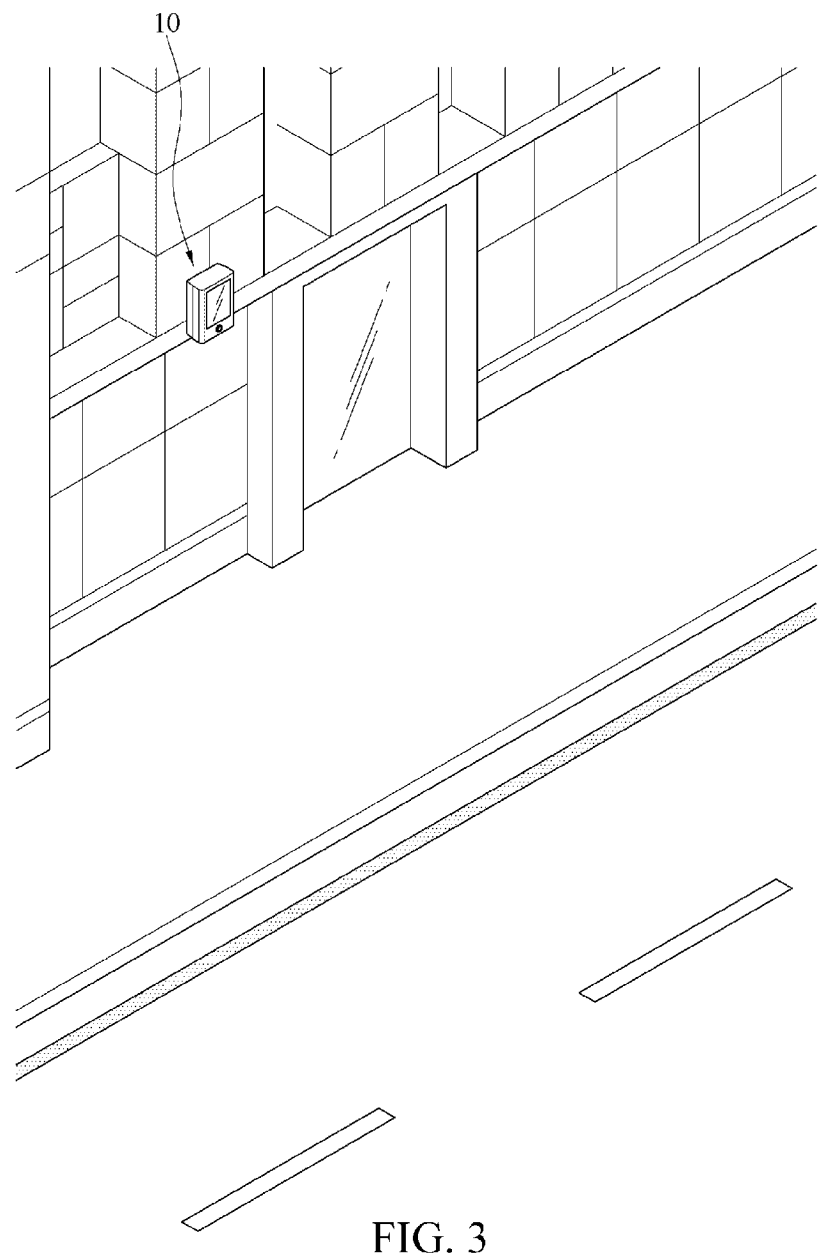
FIG. 3 is a schematic diagram of a practical application of the embodiment of the lighting device according to the present invention.

The light source 12 may be specifically a light emitting diode (LED), an incandescence bulb, a fluorescent lamp, or a halogen lamp. The light source 12 may be driven by a current, so as to emit light to illuminate an environmental scene. As shown in FIG. 3, FIG. 3 is a schematic diagram of a practical application of the embodiment of the lighting device according to the present invention. To facilitate the description, in FIG. 3, a lamp disposed outdoors is used as an example of the lighting device 10, and the lighting device 10 is used to illuminate an outdoor environmental scene, for example, when it is dark, the lighting device 10 may drive the light source 12 to emit light. However, the present invention is not limited thereto. In some embodiments, the lighting device 10 may be a lamp disposed indoors, for example, a light fixture at a staircase or at a corridor.

The driving module 14 is coupled to the light source 12, and is configured to drive the light source 12. In an embodiment, the driving module 14 may have a power supply unit (for example, a battery or a power supply circuit), so as to supply power to the light source 12 for illuminating the environmental scene. For example, the driving module 14 may be specifically a circuit architecture using a current limiting resistor, a circuit architecture using a switching converter, or a drive circuit architecture using a linear constant current.

The sensing module 16 is configured to obtain a brightness value corresponding to the environmental scene illuminated by the light source 12. In an embodiment, the sensing module 16 may be a light sensor, for example, an infrared light sensor, an ultraviolet light sensor, an optical fiber sensor, or a photoresistor, for sensing the brightness value of the environmental scene illuminated by the light source 12. In another embodiment, the sensing module 16 may be an image sensor that obtains the brightness value of the environmental scene after analyzing a captured image. In a normal state (that is, the environmental scene is not subjected to another affecting factor, for example, no vehicles or passers-by passes the environmental scene illuminated by the light source 12), a stronger intensity of the light emitted by the light source 12 results in a greater brightness value of the corresponding environmental scene.

In an embodiment, the sensing module 16 may merely sense the brightness of a partial region of the environmental scene, for example, in a normal state, a brightness variation amount of a partial area in the environmental scene is not large, and therefore, the sensing module 16 may be configured to sense the brightness of the partial area, so as to obtain the brightness value of the environmental scene. Specifically, as shown in FIG. 3, in this environmental scene, vehicles usually drive on the part of an outdoor road, which affects the brightness value of the environmental scene. In an embodiment, the sensing module 16 may be configured to sense the brightness value of the part of a sidewalk (for example, a sensing direction of the sensing module 16 directs to the sidewalk), thereby avoiding an error or a misjudgment caused by an impact of another factor (for example, a vehicle lamp) on an actual brightness value generated by the light source 12 illuminating the environmental scene. Besides, in another embodiment, the brightness value of a partial area in the environmental scene may be obtained by means of the control module 18, that is, the sensing module 16 senses the brightness of the entire environmental scene, and the control module 18 merely uses the brightness value of the partial area in the environmental scene.

Figure 4:
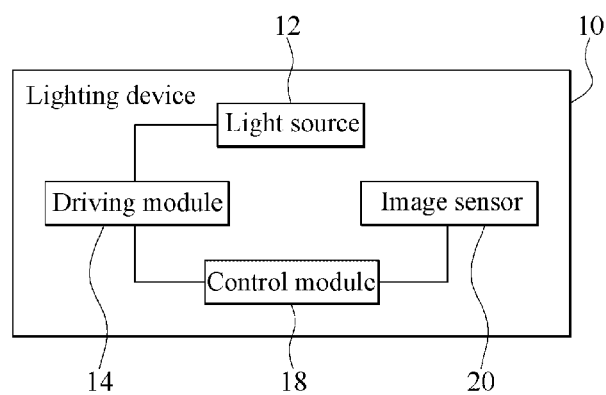
FIG. 4 is a block diagram of another embodiment of a lighting device according to the present invention.
Figure 5:
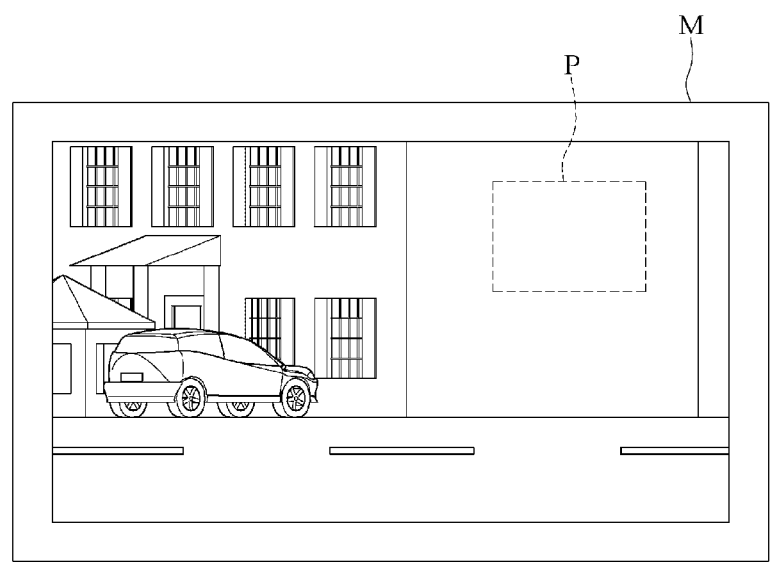
FIG. 5 is a schematic diagram of shooting of another embodiment of the lighting device according to the present invention.

As shown in FIG. 4 and FIG. 5, FIG. 4 is a block diagram of another embodiment of a lighting device according to the present invention, and FIG. 5 is a schematic diagram of shooting of another embodiment of the lighting device according to the present invention. In another embodiment, the sensing module 16 may be an image sensor 20, such as a CCD image sensor or a CMOS image sensor, included in a camera, and the image sensor 20 shoots the environmental image illuminated by the light source 12 to obtain an environmental image M (as shown in FIG. 5), that is, the environmental image M corresponds to the environmental scene. For example, the image sensor 20 continuously shoots the environmental scene to obtain a film-form environmental image M, for example, a format of the environmental image M may be Audio Video Interleave (AVI), Moving Pictures Experts Group (MPEG), MOV, WMV, FLV, and the like. Alternatively, in an embodiment, the image sensor 20 continuously shoots the environmental scene to obtain a picture-form environmental image M, for example, the format of the environmental image M may be Joint Photographic Experts Group (JPEG), Tagged Image File Format (TIFF), Portable Network Graphics (PNG), Graphics Interchange Format (GIF), and the like. Moreover, the aforementioned image sensor 20 can sense the brightness value of the environmental image M. The brightness value of the environmental image M corresponds to the brightness of the environmental scene. In other words, a stronger brightness of the environmental scene results in a larger brightness value of the environmental image M. The brightness value of the environmental image M sensed by the aforementioned image sensor 20 may be obtained by means of brightness calculation after the image sensor 20 obtains the sensed environmental image, or the image sensor 20 directly provides the brightness value to the control module 18.

In an embodiment, the image sensor 20 may determine the brightness value of the environmental image according to gray-scale values of pixels in the environmental image. For example, the brightness value of the environmental image may be an average value of the gray-scale values of the pixels. Alternatively, the image sensor 20 may determine the brightness value of the environmental image according to gray-scale values of some pixels in the environmental image, but the present invention is not limited thereto.

In an embodiment, the image sensor 20 may be configured to merely sense a partial area in the environmental image, for example, a brightness variation amount of a partial area in the environmental scene is not large, and the image sensor 20 may be configured to merely sense the brightness of the partial area, so as to obtain the brightness value of the environmental image. As shown in FIG. 3, in this environmental scene, vehicles usually drive on the part of a road, which affects the brightness value of the environmental scene. Therefore, as shown in FIG. 5, the image sensor 20 may sense a partial set region P with a small brightness variation amount in the environmental image M to obtain the brightness value, thereby avoiding an error or a misjudgment caused by an impact of another factor on an actual brightness value generated by the light source 12 illuminating the environmental scene.

The control module 18 may be a processor having a computing capability, for example, the control module 18 may be implemented by one or more of a microprocessor, a Complex Programmable Logic Device (CPLD), a Field- Programmable Gate Array (FPGA), a logic circuit, an analog circuit, a digital circuit, and/or any operation instruction or operation signal (analog and/or digital) based processing element.

As shown in FIG. 2 and FIG. 3, here, the control module 18 is coupled to the driving module 14 and the sensing module 16, and is configured to control the driving module 14 to use the first current (for example, 300 mA, 400 mA, or 500 mA, which depends on a rated current of the light source 12) to drive the light source 12 to illuminate the environmental scene. In an embodiment, the lighting device 10 is a lamp, and the control module 18 can control, when it is dark or when the brightness of the environmental scene is decreased, the driving module 14 to output the first current to drive the light source 12 to emit light to illuminate a street. For example, the control module 18 may decide, according to a preset period of time (for example, from 6 p.m. to 6 a.m.) and the brightness of the environmental scene sensed by the sensing module 16, a time for controlling the driving module 14 to drive the light source 14.

Besides, after controlling the driving module 14 to use the first current to drive the light source 12, the control module 18 further controls the sensing module 16 to sense the brightness of the corresponding environmental image, so as to obtain the first brightness value (which may be obtained by using the foregoing light sensing manner or the image sensing manner, and details are not described herein again).

Figure 6:
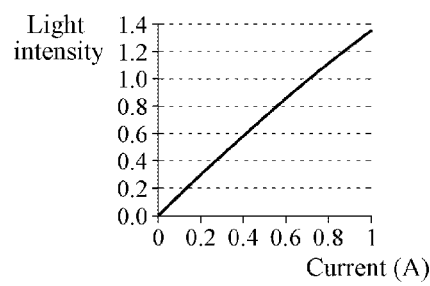
FIG. 6 is a brightness-current curve diagram of an embodiment of a lighting device according to the present invention.

In an embodiment, referring to FIG. 6, FIG. 6 is a brightness-current curve diagram of an embodiment of a lighting device according to the present invention. In a normal state (that is, the light source 12 is not in a thermal attenuation state), a greater current inputted into the light source 12 results in a stronger intensity of the light emitted by the light source 12.

TABLE 1

| Current (mA)     | 300 mA | 500 mA | 700 mA | 900 mA | 1,000 mA |
|------------------|--------|--------|--------|--------|----------|
| TC (° C.)        | 30.9   | 35.8   | 40.6   | 45.9   | 48.3     |
| Brightness value | 106    | 129    | 145    | 155    | 159      |

Figure 7:
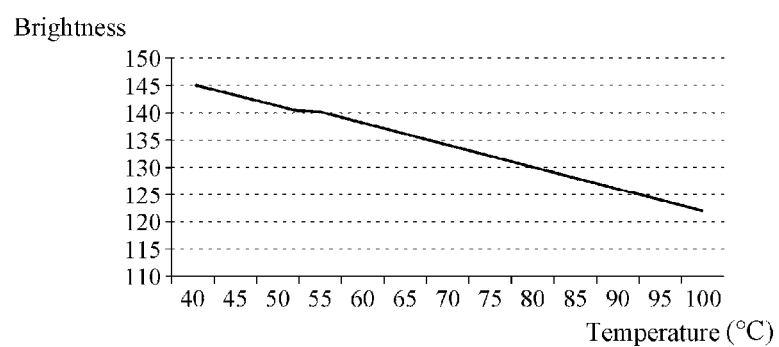
FIG. 7 is a curve diagram of thermal attenuation of an embodiment of a lighting device according to the present invention.

Referring to the table 1 disclosed above, the brightness value of the environmental scene illuminated by the light source 12 increases with an increase in the intensity of the light emitted by the light source 12. A unit exists for the brightness value may be lumen (lm), Lux (Lux), or luminance ($cd/m^2$). In a normal state, a greater input current received by the light source results in a greater brightness and a higher temperature. However, when the light source 12 is subjected to thermal attenuation or optical attenuation, a same input current results in a smaller generated brightness as compared with the brightness generated in a relatively normal state (that is, the thermal attenuation or the optical attenuation does not occur). The aforementioned thermal attenuation refers to a decrease in brightness caused by an increase in temperature of the light source 12. For this, reference may be further made to FIG. 7 (FIG. 7 is a curve diagram of thermal attenuation of an embodiment of a lighting device according to the present invention) and the table 2 disclosed below.

TABLE 2

| (current 700 mA) | | | | | | | | |
|---|---|---|---|---|---|---|---|---|
| TC (°C.) | 40.6 | 45 | 50 | 55 | 60 | 65 | 70 | 75 80 |
| Brightness Y | 145 | 143 | 141 | 140 | 138 | 136 | 134 | 132 130 |

Using a current of 700 mA to drive the light source 12 is used as an example herein, and the brightness of the light source 12 decreases with an increase in temperature. Moreover, the aforementioned optical attenuation refers to brightness attenuation caused by a substance (for example, dust) in an illuminating direction of the light source 12 or caused by a service life of the light source 12. In an embodiment, when the brightness of the environmental scene illuminated by the light source 12 is attenuated, the control module 18 determines, by controlling an input current, a reason why the light source 12 is substantially subjected to brightness attenuation. Detailed description is provided below:

In an embodiment, the control module 18 controls, when the first brightness value is less than a reference brightness value (that is, when the brightness of the environmental scene illuminated by the light source 12 is attenuated), the driving module 14 to use a second current to drive the light source 12, the second current being greater than the first current by a predetermined amplitude value. The reference brightness value may be voluntarily set, or the reference brightness value is set in factory as a brightness value that is generated when the light source 12 is driven by the first current. For example, the driving module 14 first uses a current of 500 mA (that is, the first current) to drive the light source 12, when the sensing module 16 senses that the brightness of the environmental scene is attenuated (the brightness value fails to reach the reference brightness value), the control module 18 controls the driving module 14 to increase the current value, for example, controls the driving module 14 to use a current of 700 mA (that is, the second current value, and at this time, the predetermined amplitude value being 200 mA) to drive the light source 12. The control module 18 further controls the sensing module 16 to sense the brightness of the environmental scene illuminated by the light source 12 after the current is increased, so as to obtain a second brightness value.

In an embodiment, the control module 18 further updates the aforementioned reference brightness value according to a usage time of the light source 12 (accumulated duration of emitting light for illumination). For example, the light source 12 is generally subjected to a decrease in intensity of light emitted by the light source 12 with the usage time of the light source 12. For example, the intensity of the light emitted by the light source 12 after the light source 12 is used for one year is generally less than the intensity of the light emitted by the light source 12 after the light source 12 is used for one month. Therefore, the control module 18 may decrease the reference brightness value with an increase in the usage time (the accumulated duration of emitting light for illumination) of the light source 12. In an embodiment, the control module 18 may updates the reference brightness value to the original reference brightness value after subsequent maintenance and replacement of the light source 12.

In an embodiment, the control module 18 may first control the driving module 14 to use the second current to drive the light source 12 and maintains the state for a set time period (for example, one minute, two minutes, or five minutes), so as to enable the light source 12 to tend to be stable, and subsequently controls the sensing module 16 to sense the brightness of the environmental image after the current is increased, so as to obtain the second brightness value.

In addition, in an embodiment, the control module 18 further controls, when the first brightness value keeps less than the reference brightness value for a preset time period (for example, 10 seconds, 20 seconds, or one minute), the driving module 14 to use the aforementioned second current to drive the light source 12. This method can exclude a case of an instantaneous change in the brightness of the environmental scene caused by an external factor (for example, a vehicle whose vehicle lamp is on passes the environmental scene illuminated by the light source 12) rather than the brightness of the light emitted by the light source 12.

In an embodiment, the aforementioned increased predetermined amplitude value (that is, the increased current value) is responsive to a temperature of the light source 12 and an intensity of light emitted by the light source 12, that is, if the current applied to the light source 12 is increased by an additional current value, the temperature of the light source 12 and the intensity of the light emitted by the light source 12 change. In an embodiment, the control module 18 compares the aforementioned second brightness value with the first brightness value to determine the reason that causes the brightness attenuation of the environmental scene, for example, when the second brightness value is less than or equal to the first brightness value, it is determined that the light source 12 is in a thermal attenuation state, and when the second brightness value is greater than the first brightness value, it is determined that the light source 12 is in an optical attenuation state. For example, when the light source 12 is in the normal state (that is, is not subjected to thermal attenuation), a greater current provided to the light source 12 results in a greater brightness generated by the light source 12. That is, when being driven by the first current (for example, 500 mA), the light source 12 emits light with a first intensity, and when being driven by the second current (for example, 700 mA), the light source 12 emits light with a second intensity. In a normal state, the second intensity is greater than the first intensity. However, as shown in FIG. 7, when the light source 12 is in the thermal attenuation state, a greater input current may results in a higher temperature of the light source 12, and at this time, the thermal attenuation causes a decrease in the brightness of the light source 12, and accordingly causes a decrease in the brightness of the environmental scene. Therefore, if the second brightness value generated after the control module 18 controls the driving module 14 to increase the current is less than or equal to the first brightness value generated before the current is increased, it can be determined that the light source 12 is in the thermal attenuation state. On the contrary, if the second brightness value generated after the control module 18 controls the driving module 14 to increase the current is greater than the first brightness value generated before the current is increased, it indicates that the light source 12 is not in the thermal attenuation state, and the brightness attenuation of the environmental scene is caused by a substance (for example, dust) in an illuminating direction of the light source 12 or caused by a decrease in service life of the light source 12, and therefore, it can be determined that the light source 12 is in the optical attenuation state, thereby accurately determining a reason for the brightness attenuation of the light source 12 and avoiding a misjudgment or an error.

In an embodiment, after it is determined that the light source 12 is in the thermal attenuation state or the optical attenuation state, the control module 18 may respond to the state by controlling the input current of the light source 12.

For example, if it is determined that the light source 12 is in the thermal attenuation state, the control module 18 can control the driving module 14 to decrease the original first current (for example, decrease the current from 500 mA to 400 mA), so as to enable the light source 12 to be returned back to a normal operating temperature. In another embodiment, a heat dissipation mechanism such as a cooling fan may be turned on to enable the light source 12 to be returned to the normal operating temperature. Besides, in an embodiment, the control module 18 may send a notification message to inform maintenance personnel that the light source 12 is currently in the thermal attenuation state or the optical attenuation state, so that the maintenance personnel can timely perform repair, maintenance, or appropriate handling.

In an embodiment, when it is determined that the light source 12 is in the optical attenuation state, the control module 18 can control the driving module 14 to increase the original first current (for example, increase the first current from 500 mA to 600 mA), thereby increasing the brightness of the light emitted by the light source 12, and further increasing the brightness of the environmental scene.

Figure 8:
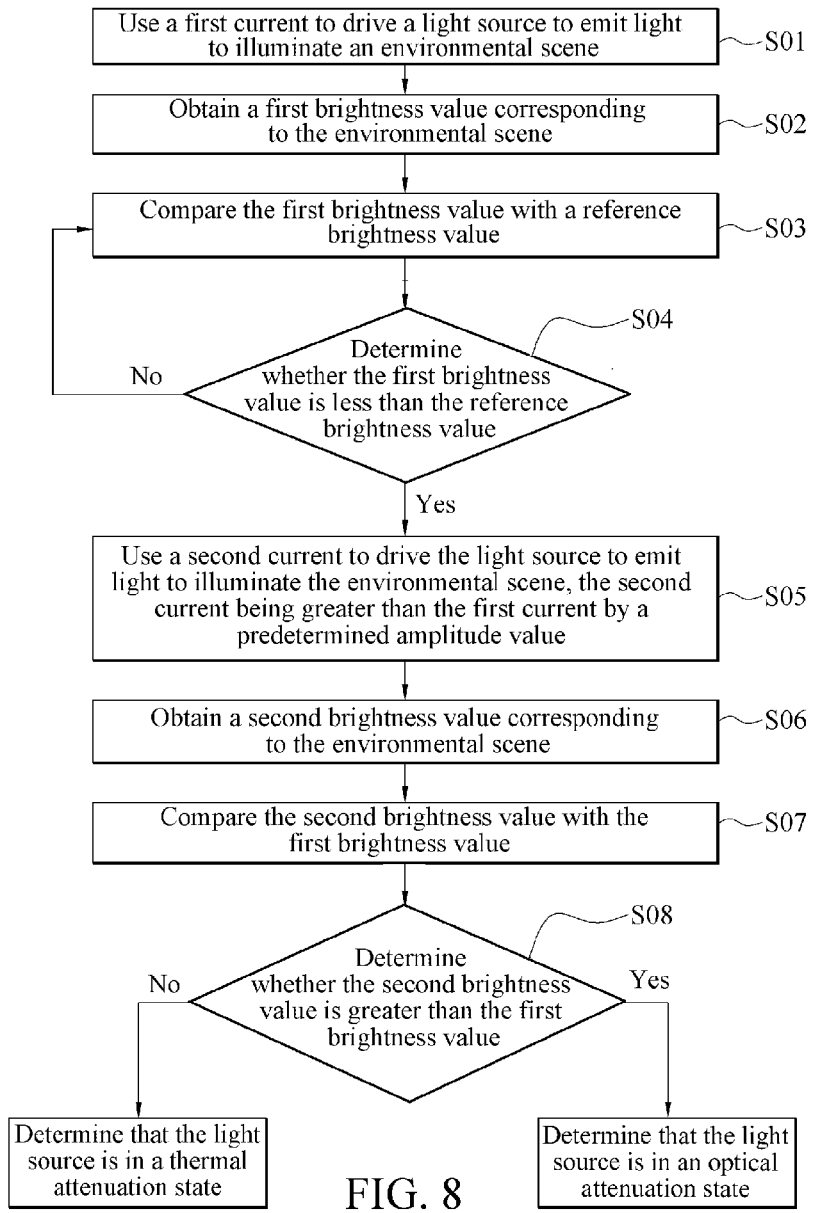
FIG. 8 is a flowchart of steps of a first embodiment of a detection method of a lighting device according to the present invention.

As shown in FIG. 8, FIG. 8 is a flowchart of steps of a first embodiment of a detection method of a lighting device according to the present invention. Reference may be made to the disclosure of the foregoing lighting device 10 for the hardware structure mentioned below, which is described herein first. The detection method of a lighting device includes the steps of:

Step S01: Use a first current to drive a light source 12 to emit light to illuminate an environmental scene. For example, a current of 500 mA is used to drive the light source 12 to illuminate the environmental scene.

Step S02: Obtain a first brightness value corresponding to the environmental scene. For example, after the light source 12 illuminates the environmental scene, the environmental scene generates a brightness, and a sensing module may be used to sense the brightness of the environmental scene, so as to obtain the first brightness value.

Step S03: Compare the first brightness value with a reference brightness value. In some embodiments, the reference brightness value may be voluntarily set, or the reference brightness value is set in factory as a brightness value that is generated when the light source 12 is driven by the first current.

Step S04: Determine whether the first brightness value is less than the reference brightness value (that is, whether the brightness of the environmental scene illuminated by the light source 12 is attenuated), and if yes, go to step S05; and if not, go back to step S03 to continue to compare the first brightness value with the reference brightness value.

Step S05: Use a second current to drive the light source to emit light to illuminate the environmental scene, the second current being greater than the first current by a predetermined amplitude value. For example, when the brightness of the environmental scene illuminated by the light source 12 is attenuated, a current value of the current provided to the light source 12 is increased. For example, the original first current for driving the light source 12 is 500 mA, and therefore, the second current may be 700 mA, that is, the predetermined amplitude value is 200 mA. In an embodiment, the predetermined amplitude value is responsive to the temperature of the light source 12 and the intensity of the light emitted by the light source 12. In other words, if the current applied to the light source 12 is increased by an additional current value, the temperature of the light source 12 and the intensity of the light emitted by the light source 12 may change.

Step S06: Obtain a second brightness value corresponding to the environmental scene. For example, a sensor may be used to sense the brightness of the environmental scene after the current is increased, so as to obtain the second brightness value.

Step S07: Compare the second brightness value with the first brightness value. That is, the brightness value of the environmental scene before the current is increased is compared with the brightness value of the environmental scene after the current is increased.

Step S08: Determine whether the second brightness value is greater than the first brightness value. In an embodiment, when the second brightness value is less than or equal to the first brightness value, it is determined that the light source 12 is in the thermal attenuation state, and when the second brightness value is greater than the first brightness value, it is determined that the light source 12 is in the optical attenuation state. For example, when the light source 12 is in a normal state (that is, the light source 12 is not subjected to thermal attenuation), a greater current provided to the light source 12 results in a greater brightness generated by the light source 12. However, when the light source 12 is in the thermal attenuation state, a greater input current results in a higher temperature of the light source 12, which causes a decrease in the brightness. Therefore, if the second brightness value generated after the current is increased is less than or equal to the first brightness value generated before the current is increased (that is, the brightness value is not increased), it can be determined that the light source 12 is in the thermal attenuation state. On the contrary, if the second brightness value generated after the current is increased is greater than the first brightness value generated before the current is increased, it indicates that the light source 12 is not in the thermal attenuation state, and the brightness attenuation of the environmental scene is caused by a substance (for example, dust) affecting a lighting effect in an illuminating direction of the light source 12 or caused by a decrease in service life of the light source 12, and therefore, it can be determined that the light source 12 is in the optical attenuation state, thereby accurately determining a reason for the brightness attenuation of the light source 12 and avoiding a misjudgment.

Figure 9:
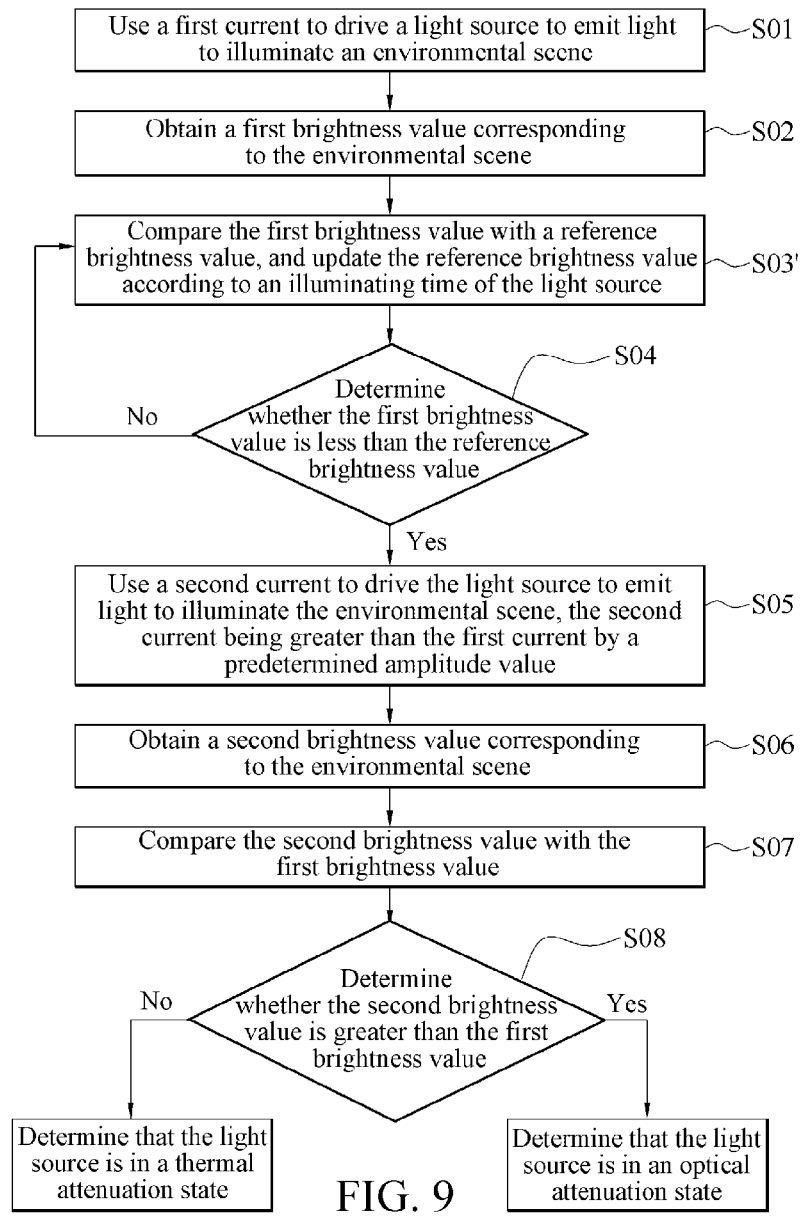
FIG. 9 is a flowchart of steps of a second embodiment of a detection method of a lighting device according to the present invention.

As shown in FIG. 9, FIG. 9 is a flowchart of steps of a second embodiment of a detection method of a lighting device according to the present invention. This embodiment differs from the first embodiment in respect of further including: updating the reference brightness value according to a usage time of the light source 12 (accumulated duration of emitting light for illumination). Here, for example, step S03': Compare the first brightness value with the reference brightness value, and update the reference brightness value according to an illuminating time of the light source 12. For example, the reference brightness value may be decreased with an increase in the illuminating time of the light source 12.

Figure 10:
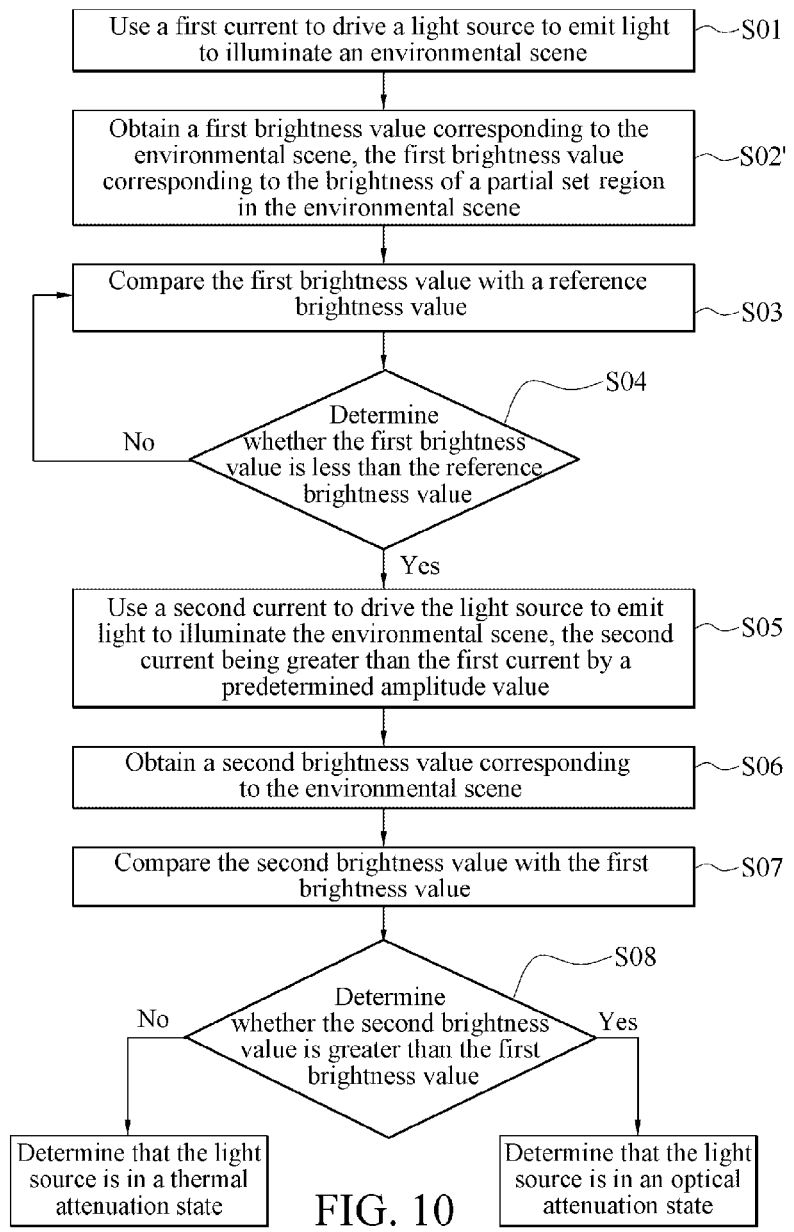
FIG. 10 is a flowchart of steps of a third embodiment of a detection method of a lighting device according to the present invention.

As shown in FIG. 10, FIG. 10 is a flowchart of steps of a third embodiment of a detection method of a lighting device according to the present invention. This embodiment differs from the first embodiment in that the first brightness value corresponds to the brightness of a partial set region in the environmental scene. Here, for example, S02': Obtain the first brightness value corresponding to the environmental scene, the first brightness value corresponding to the brightness of the partial set region in the environmental scene. For example, a partial area with a small brightness variation amount (the brightness is relatively stable) in the environmental scene may be sensed, so as to obtain the first brightness value, thereby avoiding an error or a misjudgment caused by an impact of another factor on an actual brightness value generated by the light source 12 illuminating the environmental scene.

Figure 11:
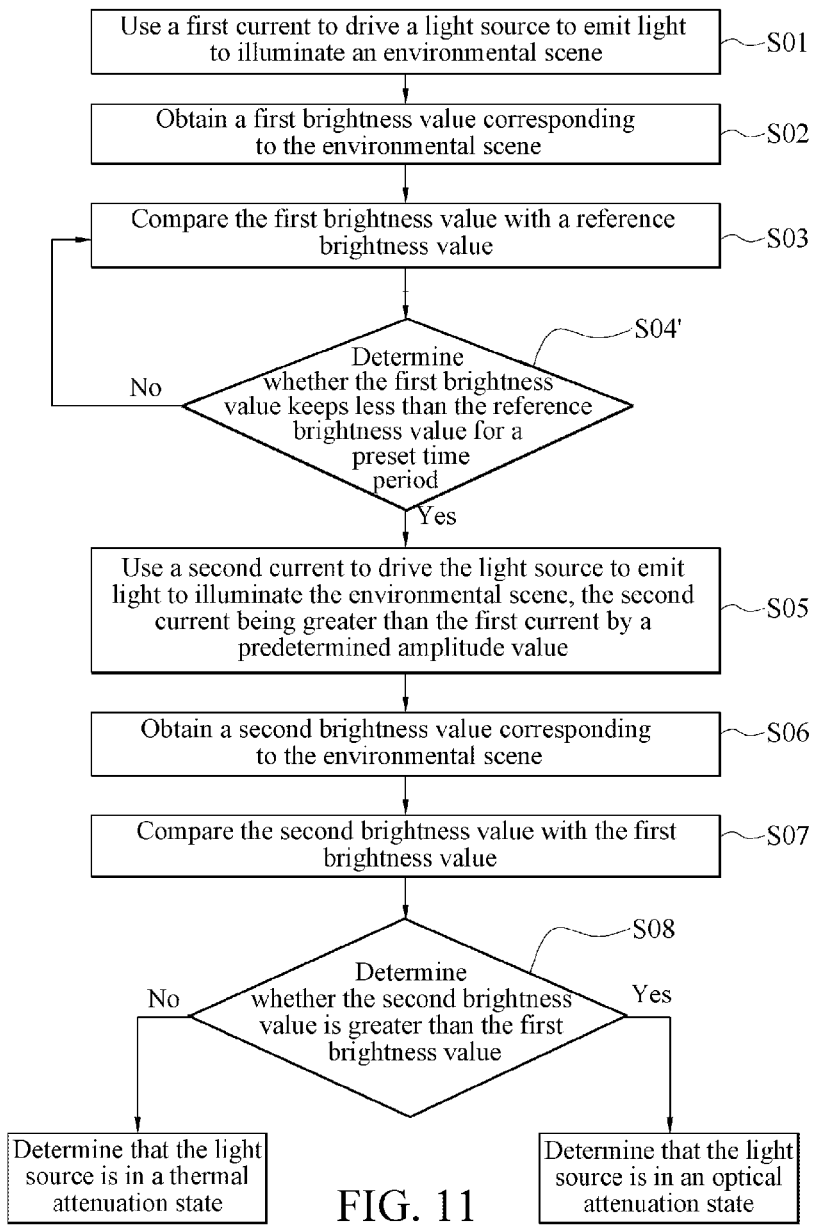
FIG. 11 is a flowchart of steps of a fourth embodiment of a detection method of a lighting device according to the present invention.

As shown in FIG. 11, FIG. 11 is a flowchart of steps of a fourth embodiment of a detection method of a lighting device according to the present invention. This embodiment differs from the first embodiment in respect of further including: further determining whether the first brightness value keeps less than the reference brightness value for a preset time period (for example, five seconds, 20 seconds, 40 seconds, or one minute). Here, for example, step S04': Determine whether the first brightness value keeps less than the reference brightness value for a preset time period, and if yes, go to step S05; and if not, go back to S03 to continue to compare the first brightness value with the reference brightness value.

To sum up, in the embodiments of the present invention, when the brightness of an environmental scene illuminated by a light source is attenuated, a current increased by a predetermined amplitude value, which is determined by synchronously taking a current, a brightness, and a temperature into consideration, is applied to the light source for detection, and whether the light source is in a thermal attenuation state or an optical attenuation state is determined by comparing a brightness value of the environmental scene before the current is increased and a brightness value of the environmental scene after the current is increased, thereby accurately determining a reason for the brightness attenuation of the light source and avoiding a misjudgment.

What is claimed is:

1. A lighting device, comprising:
    a light source, configured to emit light to illuminate an environmental scene;
    a driving module, coupled to the light source, and configured to drive the light source;
    a sensing module, configured to obtain a brightness value corresponding to the environmental scene; and
    a control module, coupled to the driving module and the sensing module, and configured to control the driving module to use a first current to drive the light source, control the sensing module to obtain a first brightness value, control, when the first brightness value is less than a reference brightness value, the driving module to use a second current to drive the light source, the second current being greater than the first current by a predetermined amplitude value, control the sensing module to obtain a second brightness value, compare the second brightness value with the first brightness value, determine that the light source is in a thermal attenuation state when the second brightness value is less than or equal to the first brightness value, and determine that the light source is in an optical attenuation state when the second brightness value is greater than the first brightness value.

2. The lighting device according to claim 1, wherein the control module further controls, after the light source is kept driven by the second current for a set time period, the sensing module to obtain the second brightness value.

3. The lighting device according to claim 1, wherein the first brightness value corresponds to the brightness of a partial set region in the environmental scene.

4. The lighting device according to claim 1, wherein the control module further controls, when the first brightness value keeps less than the reference brightness value for a preset time period, the driving module to use the second current to drive the light source.

5. The lighting device according to claim 1, wherein the control module further updates the reference brightness value according to an illuminating time of the light source.

6. The lighting device according to claim 1, wherein the predetermined amplitude value is responsive to a temperature of the light source and an intensity of light emitted by the light source.

7. A detection method of a lighting device, comprising:
(a) using a first current to drive a light source to emit light to illuminate an environmental scene;
(b) obtaining a first brightness value corresponding to the environmental scene;
(c) comparing the first brightness value with a reference brightness value;
(d) using, when the first brightness value is less than the reference brightness value, a second current to drive the light source to emit light to illuminate the environmental scene, wherein the second current is greater than the first current by a predetermined amplitude value;
(e) obtaining a second brightness value corresponding to the environmental scene;
(f) comparing the second brightness value with the first brightness value; and
(g) determining that the light source is in a thermal attenuation state when the second brightness value is less than or equal to the first brightness value, and determining that the light source is in an optical attenuation state when the second brightness value is greater than the first brightness value.

8. The detection method of a lighting device according to claim 7, further comprising: updating the reference brightness value according to an illuminating time of the light source.

9. The detection method of a lighting device according to claim 7, wherein the predetermined amplitude value is responsive to a temperature of the light source and an intensity of light emitted by the light source.

10. The detection method of a lighting device according to claim 7, wherein step (b) further comprises: the first brightness value being the brightness corresponding to a partial set region in the environmental scene.

11. The detection method of a lighting device according to claim 7, wherein step (d) further comprises: determining whether the first brightness value keeps less than the reference brightness value for a preset time period, and if yes, using the second current to drive the light source.

* * * * *